(12) United States Patent
Geynet et al.

(10) Patent No.: US 12,026,567 B2
(45) Date of Patent: Jul. 2, 2024

(54) CIRCUIT FOR PASSIVE RADIO-FREQUENCY IDENTIFICATION TAG COMPRISING A STRAIN SENSOR AND METHOD FOR MANUFACTURING A CIRCUIT

(71) Applicant: ASYGN, Grenoble (FR)

(72) Inventors: Lionel Geynet, Aubais (FR); Nicolas Delorme, Grenoble (FR)

(73) Assignee: ASYGN, Grenoble (FR)

( * ) Notice: Subject to any disclaimer, the term of this patent is extended or adjusted under 35 U.S.C. 154(b) by 0 days.

(21) Appl. No.: 17/908,662

(22) PCT Filed: Mar. 16, 2021

(86) PCT No.: PCT/FR2021/050437
§ 371 (c)(1),
(2) Date: Sep. 1, 2022

(87) PCT Pub. No.: WO2021/186128
PCT Pub. Date: Sep. 23, 2021

(65) Prior Publication Data
US 2023/0095975 A1    Mar. 30, 2023

(30) Foreign Application Priority Data
Mar. 18, 2020 (FR) .................................... 2002676

(51) Int. Cl.
*G06K 19/07* (2006.01)
(52) U.S. Cl.
CPC ..... *G06K 19/0717* (2013.01); *G06K 19/0709* (2013.01)

(58) Field of Classification Search
CPC .................................................. G06K 19/0717
See application file for complete search history.

(56) References Cited

U.S. PATENT DOCUMENTS 6,712,276 B1    3/2004 Abali et al.
6,720,866 B1    4/2004 Sorrells et al.
(Continued)

FOREIGN PATENT DOCUMENTS

CN    104361388 A    2/2015
FR    3015729 A1    6/2015
(Continued)

OTHER PUBLICATIONS

Search Report for French Patent Application No. FR2002676 mailed Dec. 16, 2020.
(Continued)

*Primary Examiner* — Joseph H Feild
*Assistant Examiner* — Pameshanand Mahase
(74) *Attorney, Agent, or Firm* — Perilla Knox & Hildebrandt LLP; Stephanie L. Davy-Jow (57) ABSTRACT

A circuit for a passive radio-identification tag operating in a UHF band is described, configured for a radio communication with a reader that emits a reading signal. The circuit is produced as a single chip, comprising one or more transducers for measuring a strain, a first sub-circuit configured for the acquisition of the transducer measurement, and a second sub-circuit configured for the radio transmission of the acquired measurement to the reader.

18 Claims, 3 Drawing Sheets

(56) References Cited

U.S. PATENT DOCUMENTS

| | | | |
|---|---|---|---|
| 9,789,738 B2 | 10/2017 | Rokhsaz et al. | |
| 10,872,284 B2* | 12/2020 | Frandsen | G06K 19/0709 |
| 2006/0273904 A1* | 12/2006 | Funo | H01Q 1/2208 |
| | | | 340/572.1 |
| 2007/0096880 A1 | 5/2007 | Nagai | |
| 2008/0136619 A1 | 6/2008 | Moran | |
| 2010/0231407 A1 | 9/2010 | Carr | |
| 2012/0256160 A1* | 10/2012 | Wang | H01L 29/872 |
| | | | 257/E29.069 |
| 2013/0099897 A1 | 4/2013 | Forster | |
| 2015/0347791 A1* | 12/2015 | Desai | G06K 19/0717 |
| | | | 340/10.1 |

FOREIGN PATENT DOCUMENTS

| | | | |
|---|---|---|---|
| WO | 0045331 A1 | 8/2000 | |
| WO | 2019005043 A1 | 1/2019 | |
| WO | WO-2019005043 A1 * | 1/2019 | G06K 19/07 |

OTHER PUBLICATIONS

International Search Report for International Patent Application No. PCT/FR2021/050437 mailed Sep. 23, 2021.
B. Rue, B. Olbrechts, J.-. Raskin and D. Flandre, "A SOI CMOS smart strain sensor," IEEE 2011 International SOI Conference, Tempe, AZ, 2011, pp. 1-2 (abstract provided).
C. Felini et. al. "Fully RF Powered UHF-RFID Sensors Platform", Procedia Engineering 87 (2014) 1346-1349 (abstract provided).

* cited by examiner

CIRCUIT FOR PASSIVE RADIO-FREQUENCY IDENTIFICATION TAG COMPRISING A STRAIN SENSOR AND METHOD FOR MANUFACTURING A CIRCUIT

CROSS-REFERENCE TO RELATED APPLICATIONS

This application is a national phase application under 35 U.S.C. § 371 of International Application No. PCT/FR2021/050437 filed Mar. 16, 2021 entitled "CIRCUIT FOR PASSIVE RADIO-FREQUENCY IDENTIFICATION TAG COMPRISING A STRAIN SENSOR AND METHOD FOR MANUFACTURING A CIRCUIT," which claims the benefit of and priority to French Patent Application No. FR2002676 filed Mar. 18, 2020, the contents of both of which being incorporated by reference in their entireties herein.

TECHNICAL FIELD

The present disclosure relates to contactless devices, for example of an radio-frequency identification (RFID) type, comprising sensors for recording events over a long period of time without requiring an external electrical power supply. The disclosure relates, in particular, to circuits for passive radio-identification tags operating in an ultra high-frequency (UHF) band, configured fora radio communication with a reader that emits a periodic reading signal, in which a period of the reading signal comprises a power recovery phase and a communication phase.

BACKGROUND

In a manner known in the related art, a circuit of RFID (Radio Frequency Identification) type can serve as an RFID tag also known as a marker and is associated with an object to be monitored. The circuit comprises or is optionally connected by an interface with a sensor to measure at least certain physical parameters relating to this subject such as for example the ambient temperature, the humidity or the acceleration.

The circuit generally takes the form of an adhesive label glued to the object to be monitored or a device integrated into the object to be monitored. The object to be monitored is for example an item of industrial equipment, an item of goods, a product or a living organism which is necessary to monitor through at least one measured physical parameter.

In general, such a contactless device includes a memory storing module able to store measurements acquired by the measuring module, an antenna able to transmit these measurements to an interrogator via electromagnetic signals and a source of electrical power for supplying, in particular, the measuring module.

Such a system conventionally comprises an RFID reader or interrogator and a contactless device comprising an RFID circuit (or tag) (or a plurality of circuits) attached or fastened to the object to be tracked. The RFID reader generally emits a UHF signal, also known as the interrogation signal, to the RFID circuit. The use of UHF signals has the following advantages: high communication speed and the possibility to communicate with a large number of tags simultaneously.

For this purpose, the contactless device comprises one or more sensors for measuring at least one physical parameter. The sensor can be configured as a transducer, which converts one physical signal into another, for example mechanical strain into electricity.

Many types of sensor are known, e.g., a strain sensor is described by B. Rue, B. Olbrechts, J. -. Raskin and D. Flandre, "A SOI CMOS smart strain sensor," *IEEE* 2011 *International SOI Conference*, Tempe, A Z, 2011, pp. 1-2. Such a strain sensor can be used to measure the deformation or the strain of an object to be monitored.

The RFID tags used in these systems are conventionally passive tags, namely they do not include any battery or power-storing means. These tags use the power contained in the carrier of the reader signal to send back a modulated version of the reader signal to the RFID reader. At least a part of the power of the interrogation signal is recovered by a power-collecting device to supply the components of the tag. Passive tags have the advantage of being light and not burdensome and having a long lifetime.

A passive RFID tag is described, e.g., in the document FR3015729 (A1) or by C. Felini et. Al. "Fully RF Powered UHF-RFID Sensors Platform", Procedia Engineering 87 (2014) 1346-1349. RFID tags are also known from US20080136619A1, US20130099897A1, US6720866B1, CN104361388A, US9789738B2, or US20100231407A1.

The combined use of UHF interrogation signals and passive tags does however have the drawback of having a low reading distance (especially in cases where the circuit is connected to a sensor), e.g., of less than 20 cm, since the power recovered by the passive tag is limited. In this situation, the use of an external sensor connected with the circuit by an interface may consume most of the power, especially if this sensor comprises discrete electronics (or digital components), the interface is a digital interface (e.g., SPI or I2C), and/or the channel for acquiring the signal of the external sensor consumes too much power. Moreover, the read time can be very long, e.g., last more than 500 ms. Furthermore, a system comprising a circuit and an external sensor connected by an interface can have a large mass and size, if a digital interface is used.

BRIEF SUMMARY

The aim of the disclosure is to palliate all or part of the aforementioned drawbacks, particularly to allow a quick strain measurement with a reduced power consumption. The disclosure also has the aim of enabling a long reading distance, e.g., up to 5 meters, and a contactless device comprising a circuit and an external sensor connected by an interface of reduced dimensions. Furthermore, the disclosure has the aim of compliance with the EPC UHF Gen2 Air Interface protocol.

For this purpose, the disclosure makes provision for a circuit for a passive radio-identification tag operating in a UHF band, configured for a radio communication with a reader that emits a reading signal. The circuit is produced as a single chip, comprising one or more transducers for measuring a strain, a first sub-circuit configured for the acquisition of the transducer measurement and a second sub-circuit configured for the radio transmission of the acquired measurement to the reader. The chip (or die) can be considered as a single integrated circuit and/or a single chip and/or the transducer, the first sub-circuit and the second sub-circuit are integrated into the chip (in the same integrated circuit).

Consequently, owing to the integration of the transducer together with the first sub-circuit and the second sub-circuit in the chip, the measurements can be acquired and transmitted to the reader more quickly (e.g., during 1500 µs or less) with reduced power consumption (e.g., 1 µA or less). It is therefore possible to extend the reading distance (especially owing to the reduced consumption), e.g., up to 5 meters, and to reduce the dimensions (size) of the contactless device.

The transducer can be considered as a strain sensor, e.g., of a piezoresistive type and/or the transducer can be configured to measure a mechanical strain applied to the circuit and/or the transducer may comprise at least one strain sensor which is provided by two transistors sensitive to orthogonal strains, and/or the transducer may comprise at least one positive current variation strain sensor and at least one negative current variation strain sensor, and/or the transducer may comprise two or more strain sensors in series.

The use of the orthogonal transistors makes it possible to measure the strain undergone by the component along the two directions in the plane X and Y.

In particular the transducer may comprise at least one (such) positive current variation strain sensor and at least one (such) negative current variation strain sensor.

For example, the transducer may comprise two or more positive current variation strain sensors in series and two or more negative current variation strain sensors in series.

The use of the strain sensors in series makes it possible to improve (multiply) the sensitivity of the transducer to measure the strain.

The first sub-circuit may comprise a (first) element configured to supply the transducer with a supply current. This element can set up a bias current, optionally with a predetermined current gain.

The first sub-circuit can moreover comprise a (second) element configured to perform a common mode current cancellation of the output signal of the transducer or of each positive/negative current variation strain sensor. This makes it possible to only take into account the current caused by the variation of the transducer signal, except for the common mode. The range of the measurement signal can therefore be increased.

If the transducer comprises a positive current variation strain sensor and a negative current variation strain sensor, the first sub-circuit may comprise a (third) element configured to create a differential signal between the output signals of these two strain sensors, particularly after the respective cancellation of the common mode current. This additionally makes it possible to increase the range of the measurement signal.

The first sub-circuit may comprise an I/V converter configured to convert the output signal of the transducer or to convert the differential signal.

The I/V converter may be configured to convert a current signal into a voltage signal.

The I/V converter may be a passive converter and configured to create a differential voltage signal.

The converter therefore allows for a voltage signal to be acted on instead of the original current signal.

The first sub-circuit may comprise an analog-to-digital converter (ADC) configured to digitize the transducer measurement, in particular the output signal of the I/V converter. This digitized signal can be received by a commanding device of the circuit (and/or of the second sub-circuit), which can transmit it (e.g., by an antenna) to the reader.

The reader may emit a periodic reading signal comprising a power recovery phase and a communication phase. The circuit, particularly the second sub-circuit, may comprise: a commanding device configured to accumulate a power reserve from the radio wave during the power recovery phase and to communicate with the reader during the communication phase, wherein the power recovery phase comprises an acquisition phase during which the circuit powers the transducer and acquires, I/V converts, and digitizes the transducer measurement.

The commanding device can be further configured to transmit the measurement of the digitized transducer to the reader during the communication phase of the same period.

Owing to the possibility of acquiring, converting and digitizing the measurement during the acquisition phase, which is during the power recovery phase and therefore before the communication phase and therefore in a single period of the periodic reading signal, this measurement can be transmitted to the reader directly during this communication phase, such as during the same period. Consequently the response time of the circuit can be reduced. It is therefore possible to read (interrogate) several external circuits very quickly. For example, objects comprising circuits according to the disclosure can be positioned together in a crate and each read very quickly.

The circuit may further comprise an interface for connecting (at least) one external analog sensor. The interface may comprise: an electrical connection configured to connect and supply electricity to the external analog sensor and to acquire the analog measurement of the sensor, and an amplifier configured to amplify the signal of the analog measurement of the sensor. The analog-to-digital converter (ADC) can be configured to digitize the amplified analog measurement of the sensor. The power recovery phase may comprise an acquisition phase during which the interface supplies power to the external analog sensor and acquires, amplifies and digitizes the measurement of the sensor.

The commanding device can be further configured to: supply power to the interface to acquire the amplifier and digitized measurement during the acquisition phase, and transfer the amplified and digitized measurement to the reader during the communication phase of the same period.

Consequently, owing to such an interface, an analog sensor can be connected directly to the circuit, which consumes less power than a digital sensor which comprises additional electronic components/circuits. Furthermore, owing to the possibility of acquiring, amplifying and digitizing the measurement of the sensor during the acquisition phase, which is during the power recovery phase and therefore before the communication phase and therefore in a single period of the periodic reading signal, this measurement can be transmitted to the reader directly during this communication phase, such as during the same period. Consequently the response time of the circuit can be reduced. It is therefore possible to read (interrogate) several external circuits very quickly. For example, objects comprising circuits according to the disclosure can be positioned together in a crate and each be read very quickly. According to another example it is possible to measure the pressure of a tire as a vehicle passes in front of a gate.

The commanding device can be configured to: boot during a boot phase, the boot phase being before the acquisition phase and during the same power recovery phase.

The power recovery phase may further comprise before the boot phase a phase of recovery of the initial power, during which the circuit is switched off and exclusively accumulates a power reserve from the radio wave.

Consequently, a reliable boot can be ensured, since the accumulated power level is high enough.

The power recovery phase may further comprise between the boot phase and the acquisition phase a first intermediate power recovery phase, during which the circuit is switched off and exclusively accumulates a power reserve from the radio wave.

Consequently, a reliable acquisition of the measurement can be ensured, since the power level accumulated is high enough.

The power recovery phase can further comprise, after the acquisition phase and before the communication phase a second intermediate power recovery phase, during which the circuit is switched off and exclusively accumulates a power reserve from the radio wave.

Consequently, a reliable transmission of the measurement to the reader may be ensured, since the level of power accumulated is high enough.

The commanding device is optionally configured to supply the interface exclusively during the acquisition phase.

Consequently, the analog sensor can be supplied by the interface. Moreover, if the interface is exclusively activated during the acquisition phase, the power consumption can be reduced.

The commanding device is optionally configured to supply electricity to the elements of the interface sequentially, e.g., to supply the analog sensor, the amplifier and the analog-to-digital converter (ADC) sequentially.

Consequently, as each element is supplied exclusively at the moment it is needed to carry out the measurement, the instantaneous power consumption can be reduced.

The commanding device can therefore be configured to supply: first exclusively the electrical connection to supply the external analog sensor and acquire the analog measurement of the sensor, then exclusively the analog-to-digital converter (ADC) to digitize the amplified analog measurement of the sensor.

After the digitization of the measurement by the analog-to-digital converter (ADC) and during the acquisition phase, the digitized measurement is read and stored in the memory by the commanding device.

Thus, the measurement is ready at the beginning of the communication phase to be transferred to the reader.

The circuit is for example compatible with (or communicates according to) the EPC UHF Gen2 Air Interface protocol.

The disclosure moreover makes provision for a passive radio-identification system operating in a UHF band comprising: a reader configured to emit a periodic reading signal, a period of the reading signal comprising a power recovery phase and a communication phase, and a circuit as described above.

The disclosure moreover makes provision for a method for manufacturing a circuit for a passive radio frequency identification tag operating in a UHF band, configured for a radio communication with a reader that emits a reading signal, wherein the circuit is manufactured as a single chip, comprising at least one transducer for measuring a strain, a first sub-circuit for acquiring the transducer measurement and a second sub-circuit for radio-transmitting the acquired measurement to the reader.

The manufactured circuit can also have the features described above within the scope of the contactless device.

The features and advantages of the disclosure will become apparent on reading the following description, given solely by way of non-limiting example and with reference to the appended drawings.

DETAILED DESCRIPTION

Figure 1:
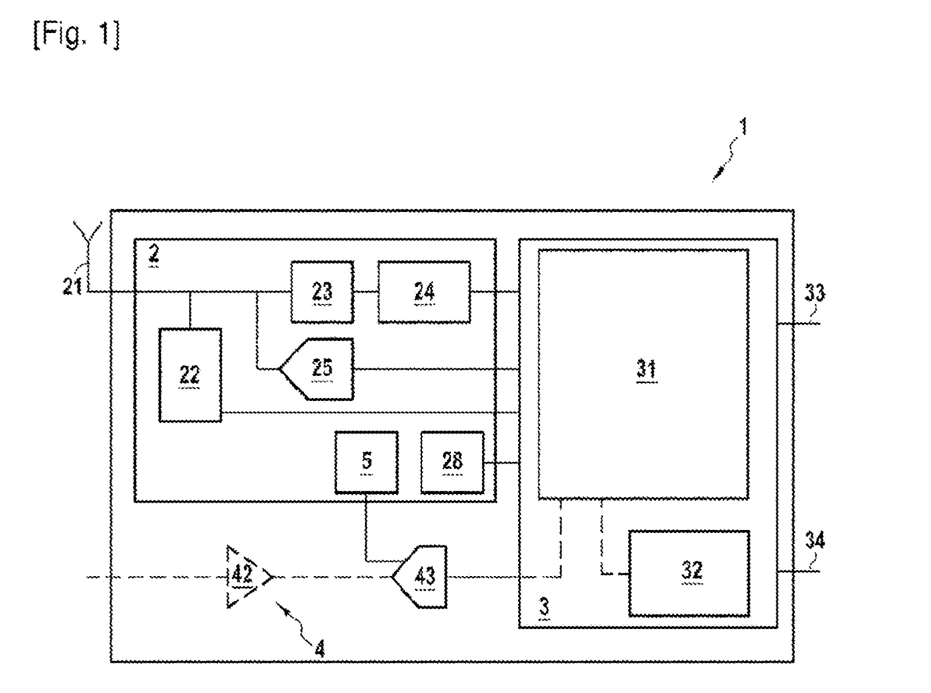
FIG. 1 is a schematic view of an architecture of a circuit according to the disclosure.

FIG. 1 is a schematic view of an architecture of a circuit 1 according to the present disclosure. The circuit 1 is of RFID type operating in a UHF band and can serve as a RFID tag. The circuit is for example compatible with (or communicates according to) the EPC UHF Gen2 Air Interface protocol.

The circuit for example takes the form of an adhesive tag glued to the object to be monitored or else the form of a chip integrated into the object to be monitored. The object to be monitored is for example an item of goods, a product or a living organism which it is necessary to monitor through at least one measured physical parameter, particularly a mechanical strain (a voltage, deformation or stress) applied to the object and therefore to the circuit.

The circuit is made as a single chip, such as an integrated circuit or a "die".

The circuit 1 operates passively, namely it does not include any battery or power-storing means. However, it uses the power contained in the carrier of the signal of the reader to send back a modulated version of the reader signal to the RFID reader. At least a part of the power of the interrogation signal is recovered by a power collecting device to supply the components of the circuit. In detail:

The circuit 1 comprises an analog module 2 which is connected to an antenna 21 to recover the power received with the antenna by the radio wave emitted by an external reader and to receive and transmit the communication signals.

The analog module 2 comprises for this purpose a modulating unit 22 (e.g., for transmitting communication signals). It further comprises a demodulating unit 25 (e.g., for receiving communication signals). It moreover comprises a rectifying unit 23 and a supply-controlling unit 24 for continuing and/or for accumulating a power reserve from the radio wave during the power recovery phase. The rectifying unit 23 can convert radio power into DC power to supply the circuit. Furthermore, the supply-controlling unit 24 can generate the DC current to supply the transducer with a bias current (optionally with a given current gain) and optionally also a "clean" DC voltage to supply the interface 4. For example, the accumulated power can be stored in a capacitance (e.g., a capacitor).

The analog module 2 is connected with a digital module 3 (or commanding device 3). This digital module 3 comprises a processor and/or a memory storage unit 31 able to process data and/or of an external analog sensor. Furthermore, the digital module optionally comprises a digital interface 32, 34, for example an SPI or I2C, and/or an interrupt interface 33. The digital module 3 controls the analog module 2, for example to be supplied with the accumulated power and to communicate with the reader via the antenna 21. The accumulation, consumption and storage of power is therefore controlled by the digital module 3 (see explanation for FIG. 2 below).

The analog module 2 and the digital module 3 can together form the second sub-circuit according to the present disclosure for radio-transmitting the transducer measurement to the reader.

The circuit 1, for example the analog module 2, moreover comprises a circuit (or transducer circuit) 5 for measuring a strain. The transducer is therefore integrated into the chip of the circuit. The transducer can be a strain sensor embodied by two transistors sensitive to orthogonal strains, for example of piezo-resistive type. The transducer and a (first) sub-circuit for acquiring the transducer measurement are described in detail in connection with FIG. 2.

The circuit further comprises an analog-to-digital converter (ADC) 43 configured to digitize the amplified analog transducer measurement or in particular of the (first) sub-circuit. The signal exiting the converter 43 is sent to the digital module 3 to be stored and transmitted to the reader. The converter can be connected to an oscillator 28 to receive a clock signal "CLK".

The circuit may further comprise other internal analog sensors (e.g., for measuring the temperature), which are for example connected to the converter 43.

The digital module 3 is also optionally connected to an interface (or interface module) 4. The interface 4 comprises an electrical connection 41 configured to connect and supply electricity to an external analog sensor and to acquire the analog measurement of the sensor. It also comprises an amplifier 42 configured to amplify the signal of the analog measurement of the sensor. The analog-to-digital converter (ADC) 43 is configured to also digitize the amplified analog measurement of the sensor.

Figure 2:
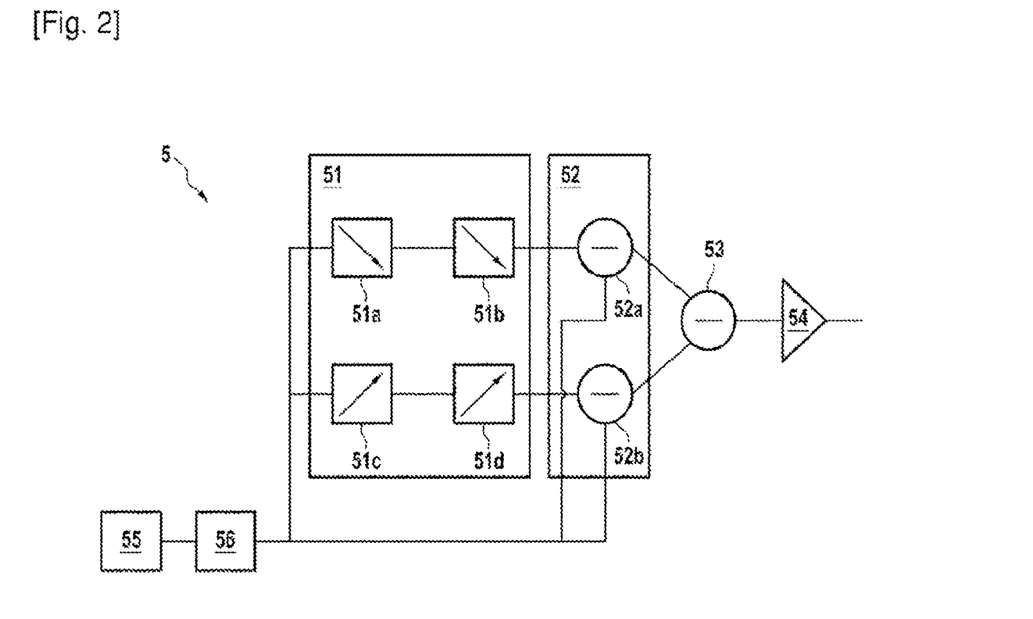
FIG. 2 is a schematic view of a transducer circuit according to the disclosure.

FIG. 2 is a schematic view of a transducer circuit according to the disclosure.

As illustrated in FIG. 2, the transducer 51 may comprise at least one strain sensor which is embodied by two transistors sensitive to orthogonal strains. In particular, in the example of FIG. 2, the transducer comprises two (or more) positive current variation strain sensors 51c, 51d in series and two (or more) negative current variation strain sensors 51a, 51b in series.

The circuit 1, for example an analog module 2, comprises an element 55 for setting up a bias current and an element 56 for applying a gain to the bias current. These elements 55, 56 supply the transducer with this supply current. These elements 55, 56 can together form the first element of the disclosure.

The circuit 1, for example the analog module 2, moreover comprises a second element 52 configured to perform a common mode current cancellation of the output signal of the transducer 51 (common mode current cancellation). For this purpose the element comprises two sub-elements 52a, 52b This makes it possible to only act on the current caused by the variation of the signal of the transducer, except for the common mode. Therefore, the range of the measurement signal can be increased.

The circuit 1, for example the analog module 2, moreover comprises a third element 53 configured to create a differential signal between the output signals of the two orthogonal strain sensors, particularly after the respective cancellation of the common mode current by the element 52. This additionally makes it possible to increase the range of the measurement signal.

The circuit 1, for example the analog module 2, moreover comprises a current/voltage I/V converter 54 configured to convert the differential output signal of the element 53 to convert a current signal into a voltage signal. The I/V converter 54 can be a passive converter and configured to create a differential voltage signal. The converter therefore makes it possible for a voltage signal to be acted on instead of the original current signal. The output signal of the I/V converter 54 is transmitted to the analog-to-digital converter (ADC) 43.

The elements 55, 56, 52, 53, the I/V converter 54 and the analog-to-digital converter (ADC) 43 can together form the first sub-circuit configured for the acquisition of the transducer measurement according to the disclosure.

Figure 3:
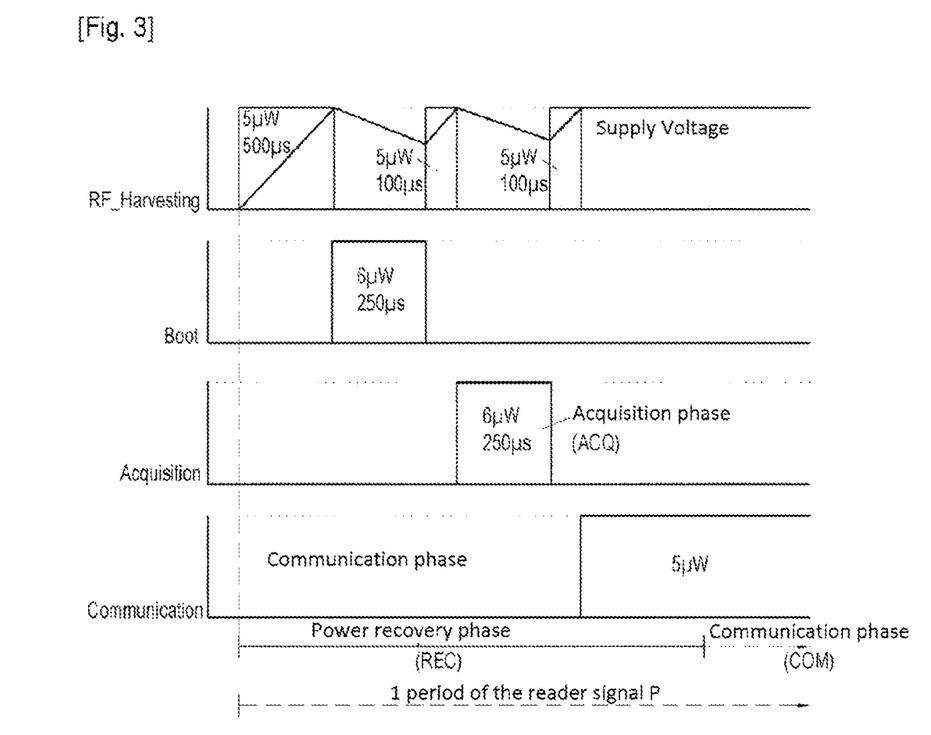
FIG. 3 is a schematic view of a diagram of the power recovery phase according to the disclosure.

FIG. 3 is a schematic view of a diagram of the power recovery phase according to the disclosure. The diagram indicates four activities (or 4 sub-diagrams), the X-axes of which indicate time.

The external reader emits a periodic reading signal. One period P of the reading signal comprises a power recovery phase REC and a communication phase COM. In the power recovery phase REC a reserve of power is accumulated from the radio wave of the external reader. The power recovery phase REC comprises the phases described below.

As indicated in the "RF_Harvesting" sub-diagram, the stored power increases in a phase of recovery of the initial power (e.g., at 5 micro-Watt for 500 micro-seconds), since no element or unit of the circuit is active and therefore all the power is stored.

Afterwards, such as when enough power is stored to allow reliable operation, the digital module 3 is booted during a boot phase (e.g., with a consumption of 6 micro-Watt for 250 micro-seconds). At the same time, because of this operation of the digital module 3, the stored power decreases.

For this reason, after the boot phase, the power recovery phase comprises a first phase of recovering the intermediate power, in which the stored power increases again (e.g., to 5 micro-Watt for 100 micro-seconds), since no element or unit of the circuit is active and therefore all the power is stored.

Afterwards, such as when enough power is stored to allow reliable operation, the transducer measurement 51 is acquired and digitized (and optionally the interface 4 supplies an external analog sensor, acquires, amplifies and digitizes the measurement of the sensor) during the acquisition phase ("Acquisition") (for example with a consumption of 6 micro-Watt for 250 micro-seconds). At the same time, because of this operation of the digital module 3, the stored power decreases.

For this reason, after the acquisition phase, the power recovery phase comprises a second phase of recovering the intermediate power, in which the stored power increases again (e.g., to 5 micro-Watt for 100 micro-seconds), since no element or unit of the circuit is active and therefore all the power is stored.

Afterwards, (or after another predefined time period) the power recovery phase can be finished and the communication phase COM can begin. During the communication phase, such as during the same period, the measurement is transferred to the external reader.

Figure 4:
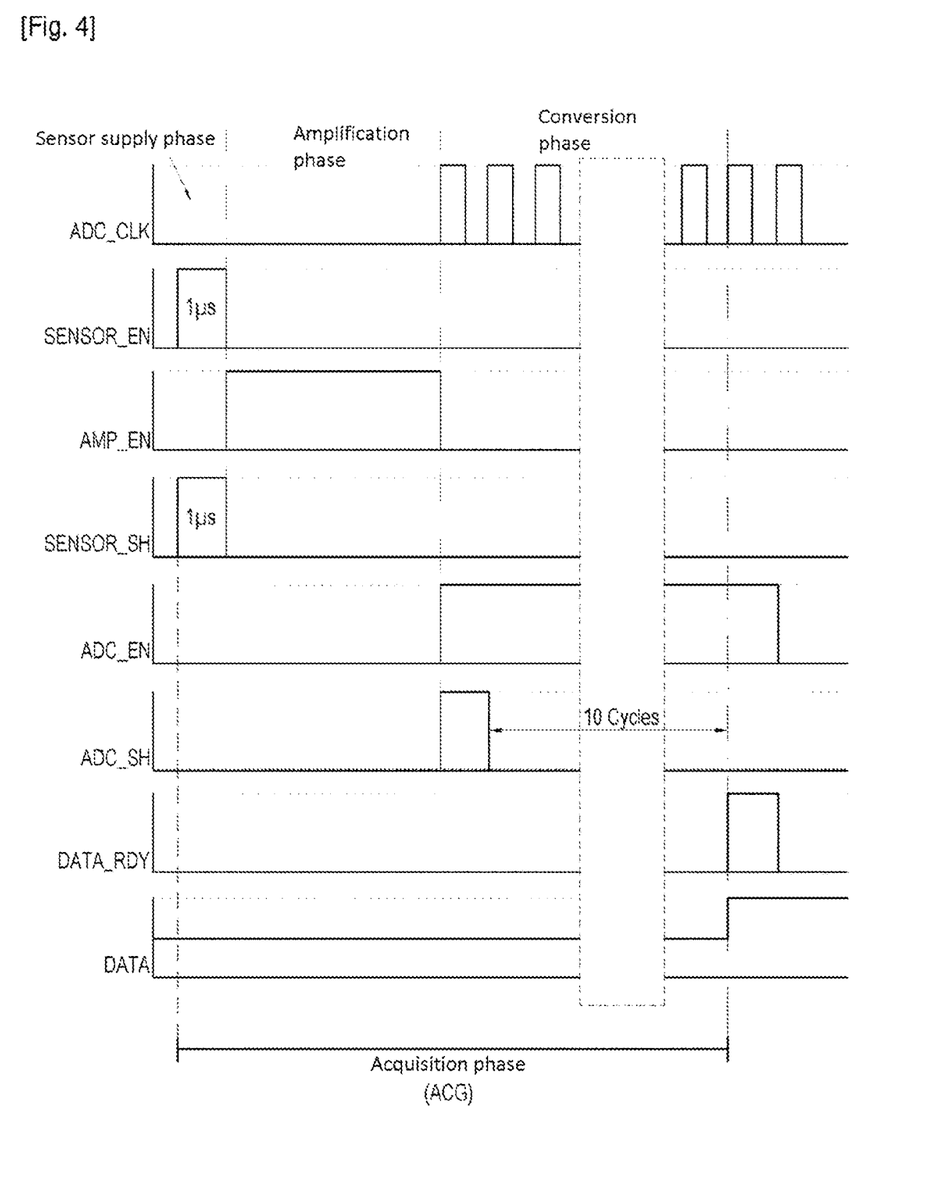
FIG. 4 is a schematic view of a diagram of the power acquisition phase ACQ according to the disclosure.

FIG. 4 is a schematic view of a diagram of the power acquisition phase ACQ according to the disclosure. The diagram indicates eight activities (or 8 sub-diagrams), the X-axes of which indicate time. During the power acquisition phase ACQ, the elements of the interface 4 are electrically powered sequentially. As indicated in the "SENSOR_EN" sub-diagram at first only the transducer 51 (and optionally the electrical connection and therefore the external analog sensor) is supplied with power (for example for 1 microsecond) and the signal generated by the transducer (and optionally of the sensor) is read and sampled. Afterwards, as an optional phase, the amplifier 42 alone is supplied to amplify the signal of the analog measurement of the sensor (see "AMP_EN" sub-diagram). Next, only the analog-to-digital converter (ADC) 43 is supplied to digitize the analog measurement (see "ADC_EN" sub-diagram). After the digitization of the measurement by the analog-to-digital converter (ADC) and still optionally during the acquisition phase, the digitized measurement is read and memorized by the processor 31, and therefore made available by the digital module 3 (see "DATA_RDY" sub-diagram).

Because of this sequential operation, the total consumption to acquire the amplified and digitized measurement can be reduced, e.g., to 1 micro-Watt. For this reason, the acquisition and transmission of the measurement can be done during a single period of the signal of the reader.

The invention claimed is:

1. A single chip, comprising:
   a circuit for a passive radio-identification tag configured to operate in an ultra-high frequency (UHF) band, configured for a radio communication with a reader that emits a reading signal, and
   at least one transducer comprising at least one mechanical strain sensor for measuring a strain, a first sub-circuit configured for an acquisition of a transducer measurement of the transducer, and a second sub-circuit configured for the radio transmission of the transducer measurement as acquired to the reader, wherein the transducer, the first sub-circuit, and the second sub-circuit are integrated into the single chip in a same integrated circuit.

2. The chip as claimed in claim 1, wherein at least one of:
   the transducer is a strain sensor of a piezoresistive type, or the transducer comprises at least one strain sensor which is embodied by two transistors sensitive to orthogonal strains,
   the transducer comprises at least one positive current variation strain sensor and at least one negative current variation strain sensor, and
   the transducer comprises two or more strain sensors in series.

3. The chip as claimed in claim 1, wherein the first sub-circuit comprises an element configured to supply the transducer with a supply current.

4. The chip as claimed in claim 1, wherein the first sub-circuit comprises an element configured to perform a common mode current cancellation of the output signal of the transducer.

5. The chip as claimed in claim 1, wherein the transducer comprises a positive current variation strain sensor and a negative current variation strain sensor, and the first sub-circuit comprises an element configured to create a differential signal between the output signals of these two positive and negative strain sensors after the respective cancellation of the common mode current.

6. The chip as claimed in claim 5, wherein the first sub-circuit comprises an UV converter configured to convert the output signal of the transducer or to convert the differential signal.

7. The chip as claimed in claim 6, wherein the UV converter is configured to convert a current signal into a voltage signal, or the UV converter is a passive converter and configured to create a differential voltage signal.

8. The chip as claimed in claim 6, wherein the first sub-circuit comprises an analog-to-digital converter (ADC) configured to digitize the transducer measurement, wherein the transducer measurement is the output signal of the UV converter.

9. The chip as claimed in claim 1, wherein:
   the reader emits a periodic reading signal comprising a power recovery phase and a communication phase,
   the second sub-circuit of the circuit, comprises a commanding device configured to accumulate a power reserve from the radio wave during the power recovery phase and to communicate with the reader during the communication phase, and
   the power recovery phase comprises an acquisition phase during which the circuit powers the transducer and acquires, UV converts, and digitizes the transducer measurement.

10. The chip as claimed in claim 9, wherein the commanding device is further configured to transmit the measurement of the digitized transducer to the reader during the communication phase of the same period.

11. The chip as claimed in claim 10, wherein:
    the circuit further comprises an interface to connect an external analog sensor, the interface comprising:
       an electrical connection configured to connect and supply electricity to the external analog sensor and to acquire the analog measurement of the analog sensor, and
       an amplifier configured to amplify the signal of the analog measurement of the analog sensor, wherein the analog-to-digital converter (ADC) is configured to digitize the amplified analog measurement of the analog sensor, and the commanding device is further configured to:
       supply the interface to acquire the amplified and digitized measurement of the analog sensor during the acquisition phase, and
       transmit and digitized measurement to the reader during the communication phase of the same period.

12. The chip as claimed claim 10, wherein the power recovery phase is between the boot phase and the acquisition phase a first intermediate power recovery phase, during which the circuit is switched off and exclusively accumulates a power reserve from the radio wave.

13. The chip as claimed in claim 10, wherein the power recovery phase is after the acquisition phase and before the communication phase a second intermediate power recovery phase, during which the circuit is switched off and exclusively accumulates a power reserve from the radio wave.

14. The chip as claimed in claim 9, wherein the commanding device is configured to boot during a boot phase, the boot phase being before the acquisition phase and during the same power recovery phase.

15. The chip as claimed in claim 14, wherein the power recovery phase further comprises before the boot phase a phase of recovery of the initial power, during which the circuit is switched off and exclusively accumulates a power reserve from the radio wave.

16. The chip as claimed in claim 9, wherein the commanding device is configured to supply the interface exclusively during the acquisition phase.

17. A passive radio-identification system configured to operate in an ultra-high frequency (UHF) band comprising:
    a reader configured to emit a periodic reading signal, a period of the reading signal comprising a power recovery phase and a communication phase, and the single chip as claimed in claim 1.

18. A method for manufacturing a circuit for a passive radio frequency identification tag configured to operate in an ultra-high frequency (UHF) band, configured for a radio communication with a reader which emits a reading signal, comprising:
    providing a circuit as a single chip that comprises at least one transducer for measuring a strain, a first sub-circuit for acquiring a transducer measurement of the transducer, and a second sub-circuit for radio-transmitting the transducer measurement as acquired to the reader, wherein the transducer, the first sub-circuit, and the second sub-circuit are integrated into the chip in the same integrated circuit.

* * * * *